(12) United States Patent
Lim et al.

(10) Patent No.: US 8,353,330 B2
(45) Date of Patent: Jan. 15, 2013

(54) HEAT EXCHANGER

(75) Inventors: Hong-Young Lim, Daejeon (KR); Kwang Hun Oh, Daejeon (KR); Yong Jun Jee, Daejeon (KR); Young-Ha Jeon, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 600 days.

(21) Appl. No.: 12/262,264

(22) Filed: Oct. 31, 2008

(65) Prior Publication Data

US 2009/0114379 A1 May 7, 2009

(30) Foreign Application Priority Data

Nov. 2, 2007 (KR) .................. 10-2007-0111309
Oct. 24, 2008 (KR) .................. 10-2008-0104612

(51) Int. Cl.
*F28F 7/00* (2006.01)
*F28D 7/06* (2006.01)
(52) U.S. Cl. .................. 165/76; 165/176
(58) Field of Classification Search .......... 165/76, 165/79, 176, 173, 175; 29/890.03, 890.052
See application file for complete search history.

(56) References Cited

U.S. PATENT DOCUMENTS

| | | | | |
|---|---|---|---|---|
| 5,582,239 A * | 12/1996 | Tsunoda et al. | ............... | 165/76 |
| 6,581,679 B2 * | 6/2003 | Fischer et al. | ............... | 165/174 |
| 7,185,698 B1 * | 3/2007 | Bernert et al. | ............... | 165/135 |
| 7,222,501 B2 * | 5/2007 | Cho et al. | ............... | 62/515 |
| 7,273,093 B2 * | 9/2007 | Durr et al. | ............... | 165/176 |
| 2002/0066553 A1* | 6/2002 | Fischer et al. | ............... | 165/174 |
| 2005/0247443 A1* | 11/2005 | Kim | ............... | 165/176 |
| 2006/0151158 A1* | 7/2006 | Ozaki | ............... | 165/173 |
| 2006/0162918 A1* | 7/2006 | Horiuchi et al. | ............... | 165/176 |
| 2007/0163766 A1* | 7/2007 | Fischer et al. | ............... | 165/176 |

FOREIGN PATENT DOCUMENTS

| | | |
|---|---|---|
| JP | 05-001896 | 1/1993 |
| JP | 07-318288 | 12/1995 |
| JP | 10-019490 | 1/1998 |
| JP | 2004-044920 | 2/2004 |

* cited by examiner

*Primary Examiner* — Frantz Jules
*Assistant Examiner* — Henry Crenshaw
(74) *Attorney, Agent, or Firm* — Lowe, Hauptman, Ham & Berner, LLP (57) ABSTRACT

The present invention relates to a heat exchanger and, more particularly, to a heat exchanger which is provided with a discharge part formed by opening of some portion of a partition wall, thereby capable of facilitating discharge of oil, air and foreign substances.

6 Claims, 13 Drawing Sheets

Fig. 1

-PRIOR ART-

HEAT EXCHANGER

TECHNICAL FIELD

The present invention relates to a heat exchanger, and more particularly, to a heat exchanger, which is provided with a discharge part formed by opening of some portion of a partition wall, thereby capable of facilitating discharge of oil, air and foreign substances.

BACKGROUND ART

A heat exchanger is an apparatus which is disposed between heat exchanging medium flowing therethrough and external environment and absorbs heat from one and discharges the heat to the other. The heat exchanger includes a first header tank and a second header tank spaced apart from each other by a predetermined distance and disposed parallel to each other; an inlet pipe and an outlet pipe formed in the first header tank or the second header tank; a plurality of tubes, each tube being fixed by the pair of the header tanks at both ends thereof to form a passage for heat exchanging medium; and a plurality of fins interposed between the tubes.

An inside of the header tank is formed with a partition wall for partitioning compartments, and various heat changing medium passages are formed using a baffle.

Also, the header tank may be manufactured by various methods including use of an extrusion pipe, folding of a plate, or mixing of the two methods.

Figure 1:
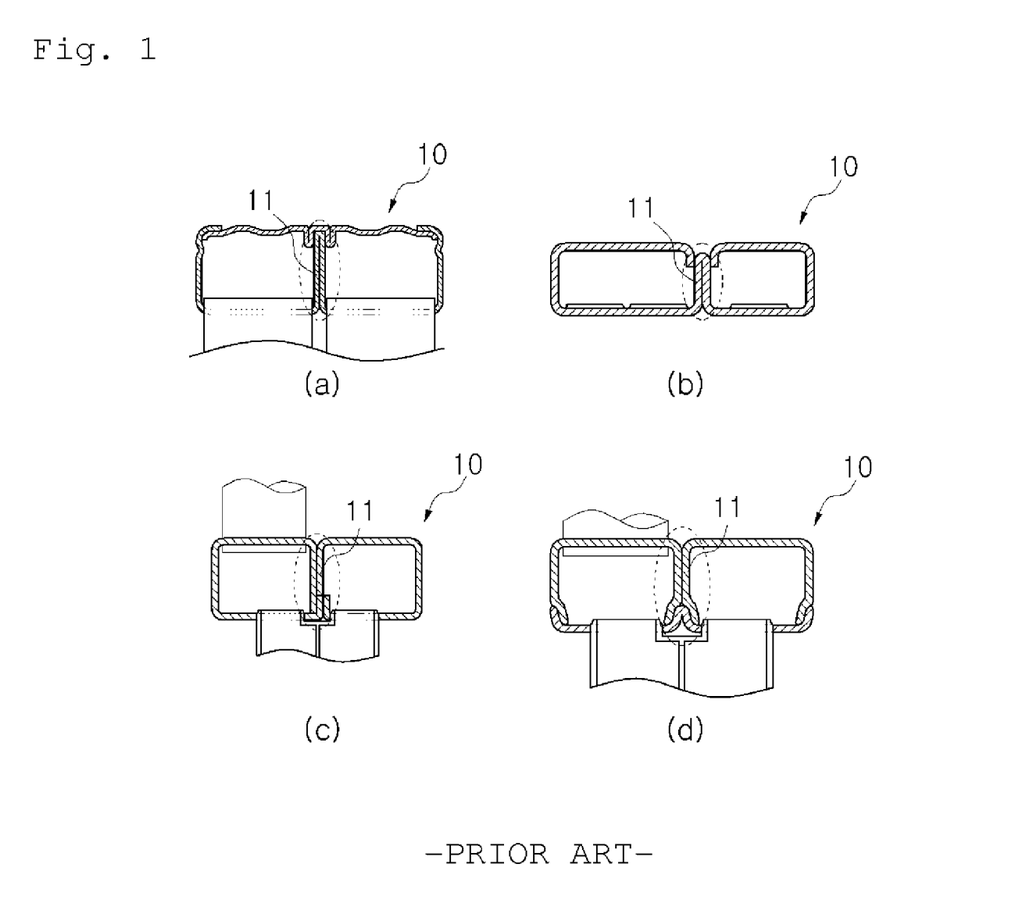
FIG. 1 is a cross-sectional view illustrating conventional header tanks.

FIG. 1 illustrates various conventional header tank structures in which two plates are joined to form the partition wall. FIG. 1(A) illustrates a header tank structure disclosed in Japanese published patent application No. 2004-044920, FIG. 1(B) Japanese published patent application No. 1998-019490, FIG. 1(C) Japanese published patent application No. 1995-318288, and FIG. 1(D) Japanese published patent application No. 1993-001896. In FIG. 1, insides of dotted ellipses indicate partition walls.

More specifically, FIG. 1(A) shows a header tank 10 in which a constitution 1 which constitutes an upper face of the header tank 10 and a constitution 2 which constitutes a lower face and two side faces and is integrally formed with the partition wall are coupled; FIGS. 1(B) and 1(C) show a header tank 10 in which a single plate is folded and a partition wall 11 is integrally formed; and FIG. 1(D) shows a header tank 10 in which side faces of reverse 'U' shaped members, each forming a compartment, are joined to form the partition wall 11 and a header formed with a tube inserting hole is coupled to form the header tank 10.

However, as shown in FIG. 1, various problems are generated when the partition wall is formed by coupling of two plates.

In general, in order to couple the two plates, flux is applied between two plates and the two plates are then brazed. However, since it is hard to remove foreign substances in the case that the foreign substances such as oil and air are mixed between the two plates, a space may be generated between the plates.

Also, since the partition wall is formed long in a rectangular shape in a longitudinal direction of the header tank, a face to be brazed is very wide. Therefore, flow of the flux is not smooth and thus joining force is not uniformly applied.

In addition, in the case that the joining area is wide, air between the faces to be joined cannot be discharged to the outside and is remained between the faces to be joined. This also results in brazing defect.

In other words, the conventional heat exchanger has a problem that the foreign substances such as oil and air cannot be easily moved and the joining force cannot be uniformly formed and thus durability of the heat exchanger is lowered when the partition wall is formed by joining of two plates.

DISCLOSURE OF THE INVENTION

It is an object of the present invention to provide a heat exchanger, in which a discharge part is formed in one face of two plates forming a partition wall and thus foreign substances remained in an inside between the two plates can be easily discharged through the discharge part, and joining force between the two plates forming the partition can be increased.

A heat exchanger (1000) according to the present invention includes a pair of header tanks (100) spaced apart from each other by a predetermined distance and disposed parallel to each other, each tank having a partition wall (130) for partitioning an internal compartments which is formed by joining two facing plates; an inlet pipe (200) and an outlet pipe (300) formed in the header tank (100); a plurality of tubes (400), each tube being fixed by the pair of the header tanks (100) at both ends thereof to form a passage for heat exchanging medium, thereby permitting the heat exchanging medium in an inside of the compartment partitioned by the partition wall (130) to flow; and a plurality of fins (500) interposed between the tubes (400), wherein at least one of a first wall (130a) and a second wall (130b) forming the partition wall (130) is provided with a discharge part (131) for discharging foreign substances formed by cutting out some area of the wall.

Preferably, the joined surface between the first wall (130a) and the second wall (130b) is opened toward the compartment in the inside of the header tank (100) through the discharge part (131).

Preferably, the discharge part (131) is formed in plural along a longitudinal direction of the partition wall (130).

Preferably, the discharge part (131) is formed alternately in the first wall (130a) and the second wall (130b) forming the partition wall (130) in a longitudinal direction of the header tank (100).

Preferably, a hole (132') for forming a communication part (132) that communicates the compartment partitioned by the partition wall (130) is formed so as not to be overlapped with the discharge part (131) formed in the first wall (130a) or the second wall (130b). More preferably, a hole (132') is formed in the portion of the first wall (130a) or the second wall (130b) corresponding to the discharge part (131) formed in the other of the first wall (130a) and the second wall (130b) so that a communication part (132) is formed to communicate the compartments partitioned by the partition wall (130).

Preferably, the discharge part (131) formed in the other of the first wall (130a) and the second wall (130b) is formed greater than the hole (132') formed in the one of the first wall (130a) and the second wall (130b) so that the discharge part (131) includes the communication part (132) therein.

Preferably, predetermined regions of the discharge parts (131) formed in the first wall (130a) and the second wall (130b) are overlapped with each other to form a communication part (132) for communicating the compartments partitioned by the partition wall (130).

Preferably, the header tank (100) is formed by coupling of the header (110) and the tank (120); and the header (110) is formed in "W" shape cross-section in such a manner that the partition walls (130) for partitioning the internal compartments are faced and joined to each other by bending a single plate and a first protrusion part (112) and a second protrusion part (113), protruded in the same direction as the direction in which the partition wall (130) is formed, are formed long at both sides of the plate in a longitudinal direction of the plate so as to provide a coupling face with the tank (120). More preferably, a clad material (C) is applied to only one face of the plate for forming the header (110), in which the first wall (130a) and the second wall (130b) are joined with each other.

Preferably, a distance ($L_1$) between the discharge parts (131) is 1 to 5 mm. More preferably, a distance ($L_2$, $L_3$) between the discharge part (131) and an end of the partition wall (130) in a height direction of the partition wall (130) is 1 to 5 mm.

Preferably, the heat exchanger (1000) is further formed with a guide slot (133) on a face in which the first wall (130a) and the second wall (130b) are joined with each other so that the foreign substances can be smoothly discharged through the discharge part (131).

Also, a method for manufacturing a heat exchanger (1000) including a pair of header tanks (100) spaced apart from each other by a predetermined distance and disposed parallel to each other, each tank having a partition wall (130) for partitioning an internal compartments which is formed by joining two facing plates; an inlet pipe (200) and an outlet pipe (300) formed in the header tank (100); a plurality of tubes (400), each tube being fixed by the pair of the header tanks (100) at both ends thereof to form a passage for heat exchanging medium; and a plurality of fins (500) interposed between the tubes (400), includes: a) a step of forming a tube inserting hole (111) for inserting an end of the tube (400) therein, a discharge part (131) formed in at least one of a first wall (130a) and a second wall (130b) forming the partition wall (130; b) a step of forming a shape of a header (110) by bending the plate (Sb); c) a step of assembling the tank (120), the tubes (400) and the fins (500) to the header (110) (Sc); and d) a step of brazing (Sd).

Preferably, the step a) is more comprised forming a hole formed in a portion corresponding to the discharge part to form a communication part in a plate.

According to the heat exchanger of the present invention, in the case that the partition wall is formed by joining of two plates, since the discharge part is formed in one plate forming the partition wall, oil, air and foreign substances are readily removed, and durability of the header tank is increased and the lifetime is prolonged as the fluxing is smoothly performed and thus brazing properties are enhanced.

Also, according to the heat exchanger of the present invention, since the communication part can be formed by controlling size and shape of the discharge part of the two plates forming the partition wall, design and modification is facilitated upon manufacture of the header tank.

BRIEF DESCRIPTION OF THE DRAWINGS

FIG. 11A is a perspective view illustrating another example of the header of the heat exchanger shown in FIG. 9.

DETAILED DESCRIPTION OF MAIN ELEMENTS

| | |
|---|---|
| 1000: heat exchanger | |
| 100: header tank | |
| 110: header | 111: tube inserting hole |
| 112: first protrusion part | 113: second protrusion part |
| 120: tank | |
| 130: partition wall | |
| 130a, 130b: two plates forming the partition wall | |
| 131: discharge part | $L_1$: distance between the discharge parts |
| $L_2$, $L_3$: distance between the discharge part and the end of the partition walls | |
| 132: communication part | 132': hole |
| 133: guide slot | |
| 140: baffle | |
| 200: inlet pipe | 300: outlet pipe |
| 400: tube | 500: fin |
| C: clad material | |

BEST MODE FOR CARRYING OUT THE INVENTION

Herein after, preferred embodiments of a heat exchanger 1000 according to the present invention will be described in detail with reference to accompanying drawings.

Figure 2:
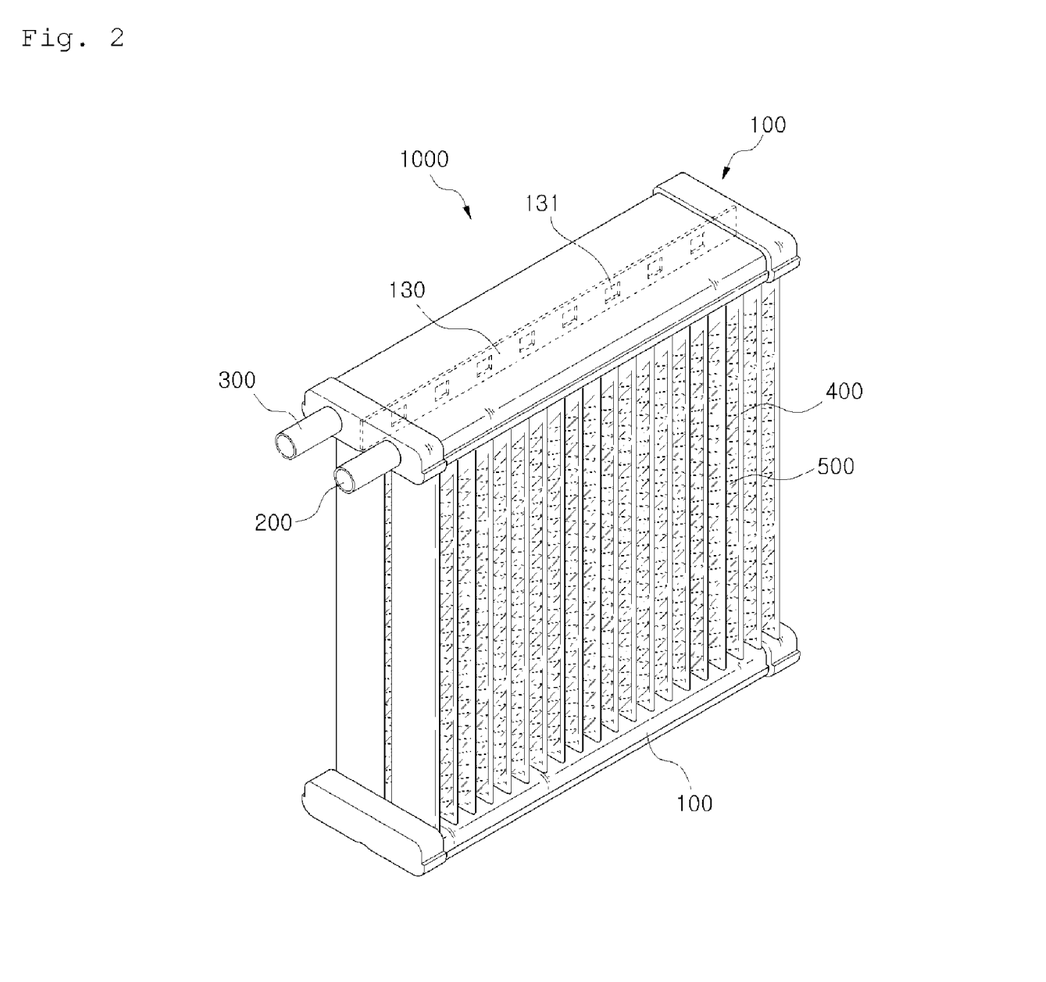
FIG. 2 is a perspective view illustrating a heat exchanger according to an embodiment of the present invention.
Figure 3:
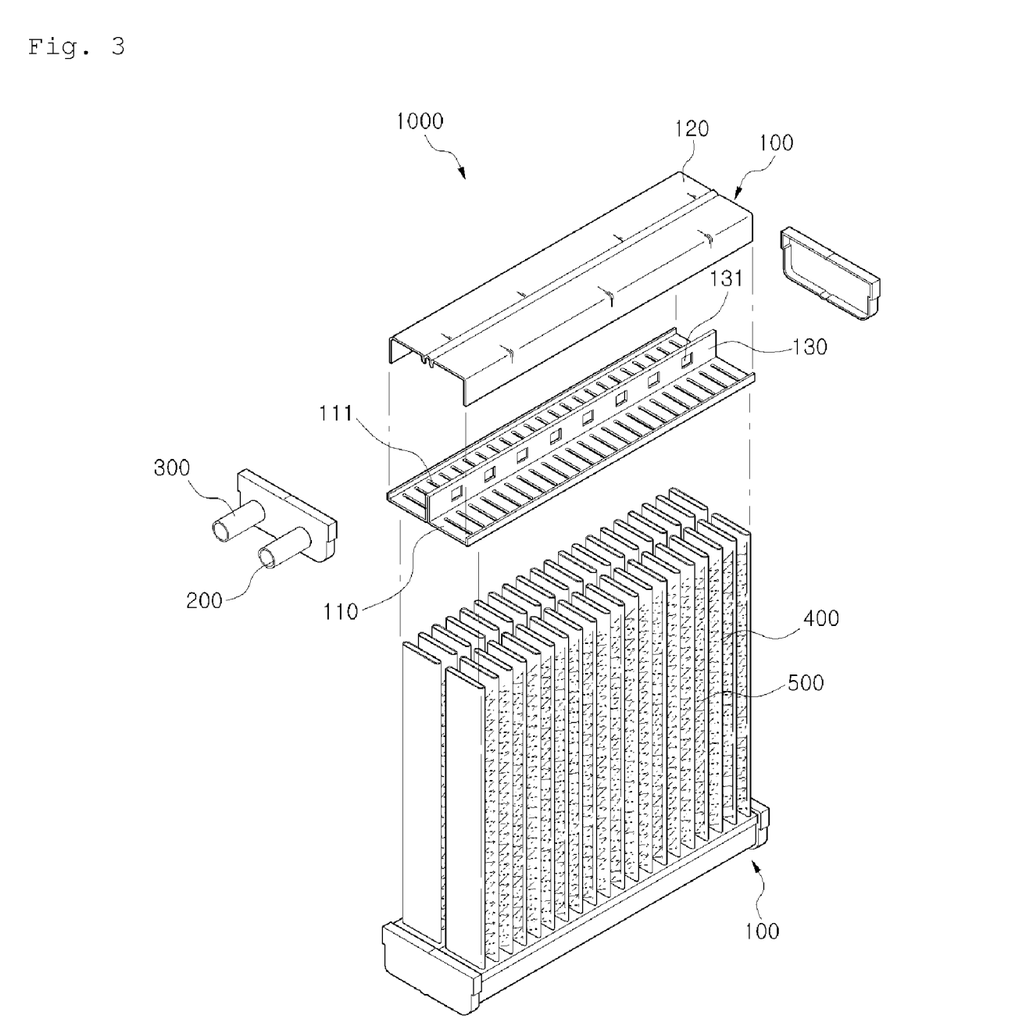
FIG. 3 is an exploded perspective view illustrating the heat exchanger shown in FIG. 2.

FIG. 2 is a perspective view illustrating a heat exchanger 1000 according to an embodiment of the present invention and FIG. 3 is an exploded perspective view illustrating the heat exchanger 1000 shown in FIG. 2.

The heat exchanger 1000 according to the present invention shown in FIGS. 2 and 3 includes a pair of header tanks 100 spaced apart from each other by a predetermined distance and disposed parallel to each other, each tank having a partition wall 130 for partitioning an internal compartments which is formed by joining two facing plates; an inlet pipe 200 and an outlet pipe 300 formed in the header tank 100; a plurality of tubes 400, each tube being fixed by the pair of the header tanks 100 at both ends thereof to form a passage for heat exchanging medium, thereby permitting the heat exchanging medium in an inside of the compartment partitioned by the partition wall 130 to flow; and a plurality of fins 500 interposed between the tubes 400, wherein at least one of a first wall 130a and a second wall 130b forming the partition wall 130 is provided with a discharge part 131 for discharging foreign substances formed by cutting out some area of the wall.

FIGS. 2 and 3 illustrate an example in which the header tank 100 is formed by coupling of a header 110 integrally formed with the partition wall 130 and a tank 120. Further, FIG. 4A illustrates the header 110 of the heat exchanger 1000 shown in FIG. 2 and FIG. 4B is a development view illustrating a plate constituting the header 110.

In more detail, the header 110 is formed in "W" shape cross-section in such a manner that the partition walls 130 for partitioning the internal compartments are faced and joined to each other by bending a single plate and a first protrusion part 112 and a second protrusion part 113, protruded in the same direction as the direction in which the partition wall 130 is formed, are formed long at both sides of the plate in a longitudinal direction of the plate so as to provide a coupling face with the tank 120.

Figure 4A:
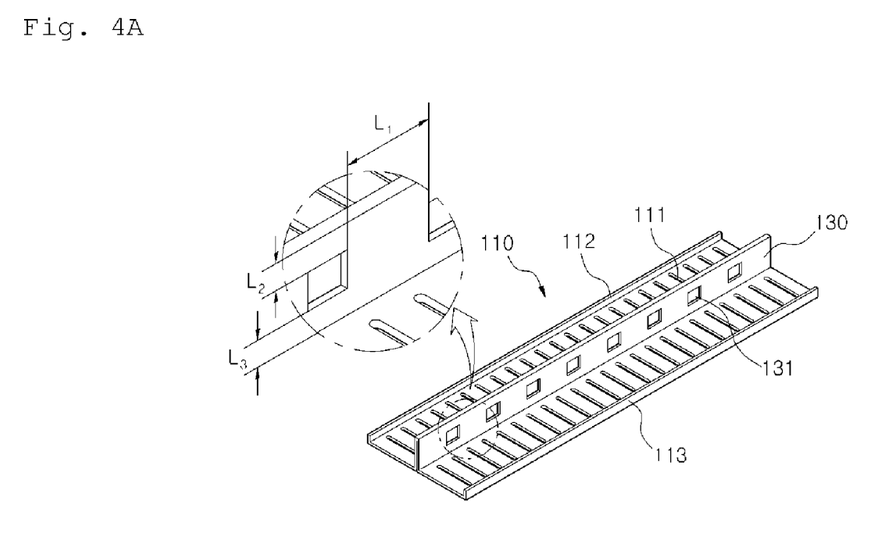
FIG. 4A is a perspective view illustrating a header of the heat exchanger shown in FIG. 2.
Figure 4B:
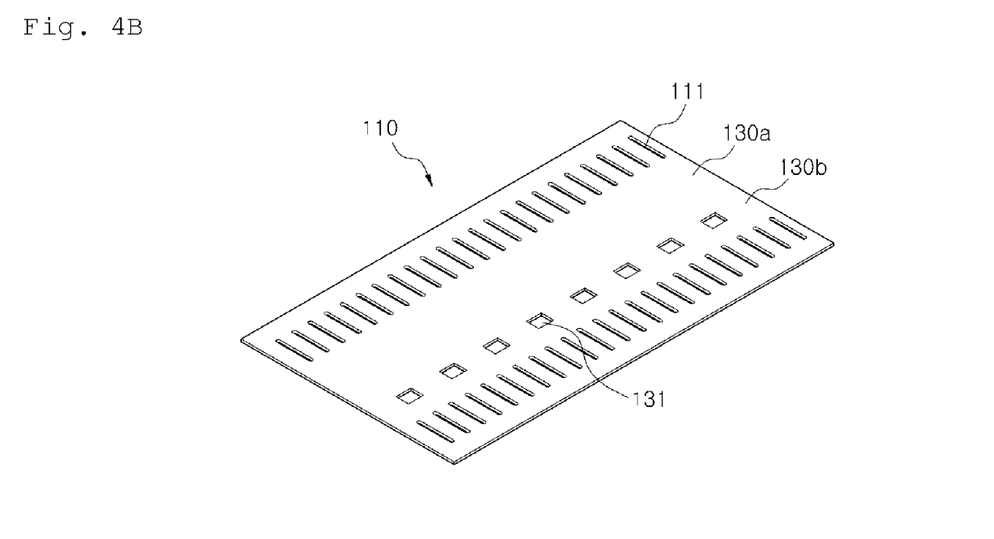
FIG. 4B is a development view illustrating a plate constituting the header shown in FIG. 4A.

At this time, since the first protrusion part 112 and the second protrusion part 113 are present for the purpose of coupling the header 110 with the tank 120, they may be formed with a lower height compared to the partition wall 130 as shown in FIG. 4A.

The cut-out discharge part 131 is formed at only one wall 130b of the first wall 130a and the second wall 130b forming the partition wall 130, and the other wall 130a of the first wall 130a and the second wall 130b, which is not formed with the discharge part 131, acts as the partition wall 130 for forming the closed space. The first wall 130a and the second wall 130b are folded without separate processing and then brazed.

In other words, the discharge part 131 allows the joined surface between the first wall 130a and the second wall 130b to be opened toward the compartment in the inside of the header tank 100, thereby facilitating discharge of foreign substances. In the heat exchanger 1000 of the present invention, since the discharge part 131 is formed at only one wall of the first wall 130a and the second wall 130b forming the partition wall 130, oil, air or foreign substances between the first wall 130a and the second wall 130b can be readily discharged through the discharge part 131 when the first wall 130a and the second wall 130b are joined, and fluxing is smoothly performed as an area joined is reduced and thus uniform joining can be achieved.

In the heat exchanger 1000 of the present invention, the discharge part 131 may be formed in plural along a longitudinal direction of the partition wall 130.

In the header 110 shown in FIGS. 4A and 4B, a plurality of discharge parts 131 is formed only at the second wall 130b with a predetermined spacing and it is preferred that a distance $L_1$ between the discharge parts 131 formed at the partition wall 130 is 1 to 5 mm.

In the case that the distance $L_1$ between the discharge parts 131 is less than 1 mm, there is a problem that it is difficult to form the discharge parts 131. On the contrary, in the case that the distance $L_1$ between the discharge parts 131 exceeds 5 mm, effect of discharging the foreign substance by the discharge parts 131 may be lowered. Therefore, the distance $L_1$ between the discharge parts 131 is preferably 1 to 5 mm.

Also, in the heat exchanger 1000 of the present invention, it is preferred that a distance $L_2$, $L_3$ between the discharge part 131 and an end of the partition wall 130 in a height direction of the partition wall 130 is 1 to 5 mm.

Since the discharge part 131 is formed in the middle of the partition wall 130 in the height direction of the partition wall 130, the distance $L_2$, $L_3$ includes both the distance between the discharge part 131 and an upper end of the partition 130 and the distance between the discharge part 131 and a lower end of the partition 130.

As shown in FIG. 4A, the reference symbol $L_2$ represents the distance between the discharge part 131 and an upper end of the partition 130 and the reference symbol $L_3$ indicates the distance between the discharge part 131 and a lower end of the partition 130.

In the case that the distances $L_2$, $L_3$ between the discharge part 131 and the ends of the partition 130 are less than 1 mm, it is difficult to perform smoothly a bending process for forming the partition wall 130. On the contrary, in the case that the distances $L_2$, $L_3$ between the discharge part 131 and the ends of the partition 130 exceed 5 mm, effect of discharging the oil, air and foreign substance by the discharge parts 131 may be lowered. Therefore, the distances $L_2$, $L_3$ between the discharge part 131 and the ends of the partition 130 are preferably 1 to 5 mm.

Figure 5A:
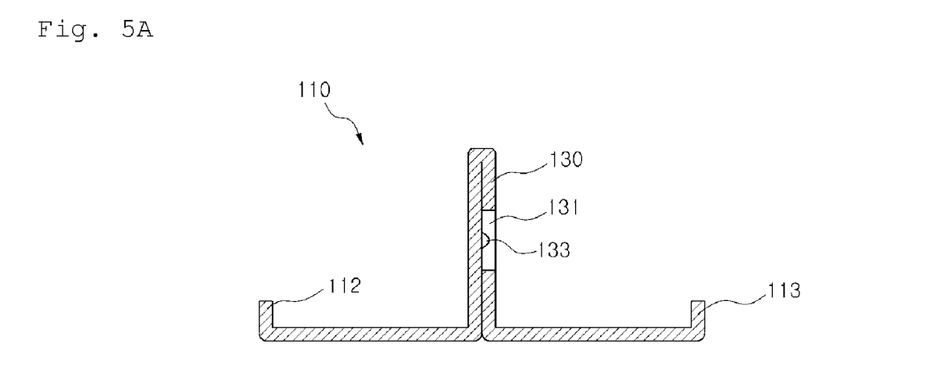
FIG. 5A is a perspective view illustrating another example of the header of the heat exchanger according to an embodiment of the present invention.
Figure 5B:
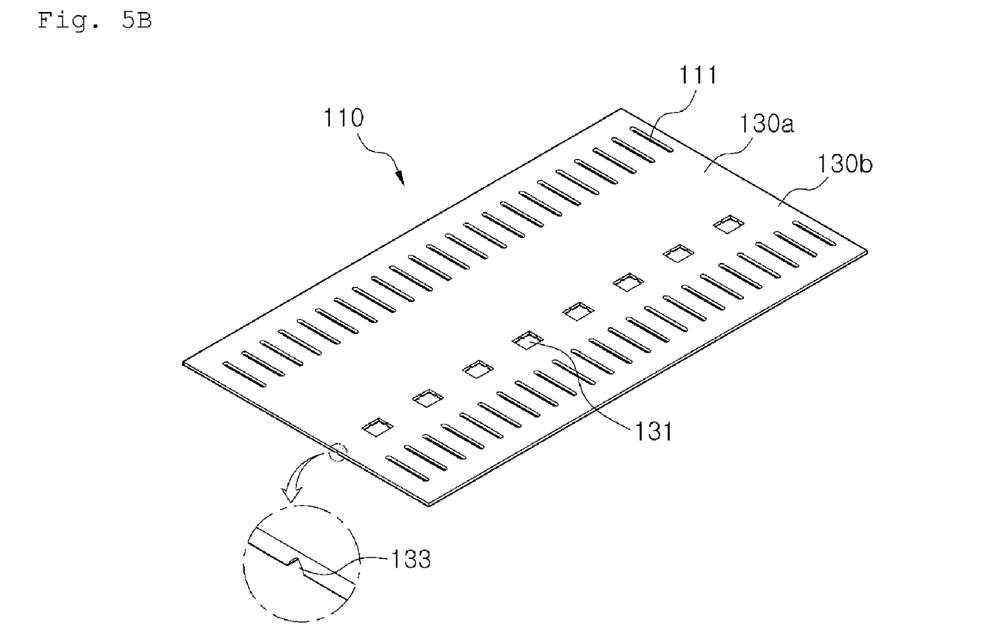
FIG. 5B is a development view illustrating a plate constituting the header shown in FIG. 5A.

FIG. 5A is a perspective view illustrating another example of the header 110 of the heat exchanger 1000 according to an embodiment of the present invention and FIG. 5B is a development view illustrating a plate constituting the header 110 shown in FIG. 5A.

As shown in FIGS. 5A and 5B, the heat exchanger 1000 of the present invention may further be formed with a guide slot 133 on a face in which the first wall 130a and the second wall 130b are joined with each other so that the foreign substances can be smoothly discharged through the discharge part 131.

The guide slot 133 is a concaved groove formed on the plate for forming the header 110 so that the foreign substances on the region not formed with the discharge part 131 can be move to the discharge part 131. By the formation of the guide slot 133, the heat exchanger 1000 of the present invention can raise more the effect of discharging the foreign substances by the discharge part 131.

While FIGS. 5A and 5B illustrate that the guide slot 133 connects between the discharge part 131 and the discharge part 131 and connects one side of the discharge part 131 and an end of the partition wall 130 (the portion protruded in the middle when the header 110 is formed), the guide slot 133 of the present invention may be formed in various shapes provided that the guide slot 133 is formed in the portion not formed with the discharge part 131 and is connected to the discharge part 131 to readily move the foreign substances to the discharge part 131.

Figure 6A:
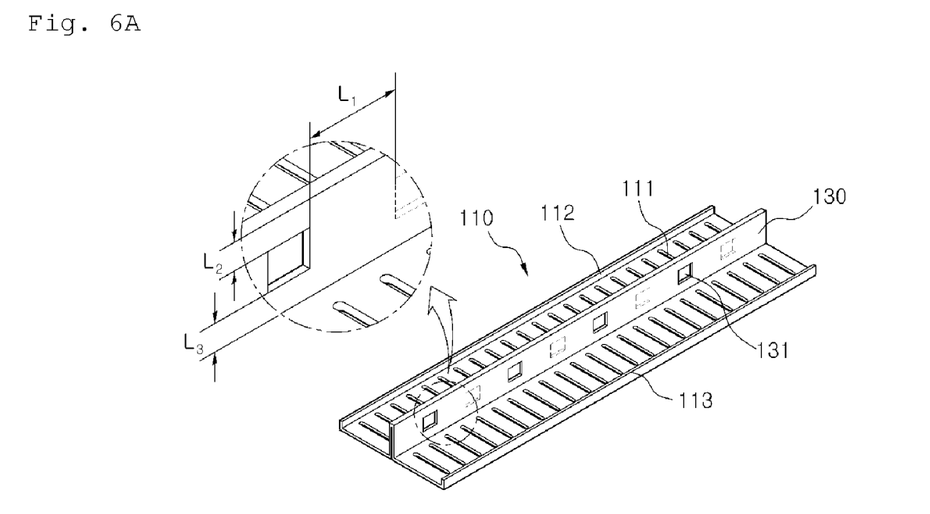
FIG. 6A is a perspective view illustrating another example of the header of the heat exchanger according to an embodiment of the present invention.
Figure 6B:
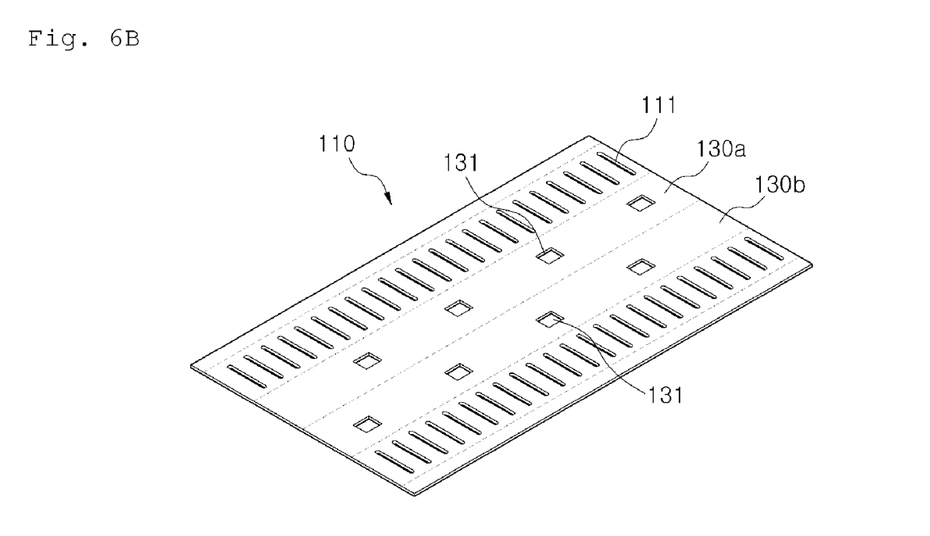
FIG. 6B is a development view illustrating a plate constituting the header shown in FIG. 6A.

FIG. 6A is a perspective view illustrating another example of the header 110 of the heat exchanger 1000 according to an embodiment of the present invention and FIG. 6B is a development view illustrating a plate constituting the header 110 shown in FIG. 6A. In the heat exchanger 1000 of the present invention, the discharge part 131 may be formed alternately in the first wall 130a and the second wall 130b in the longitudinal direction of the header tank 100.

Although the discharge part 131 is formed alternately in the first wall 130a and the second wall 130b, the function as the partition wall 130 can be performed as it is and the durability of the partition wall 130 can be increased since the discharge part 131 is closed by being joined with the first wall 130a or the second wall 130b not formed with the discharge part 131.

Figure 7A:
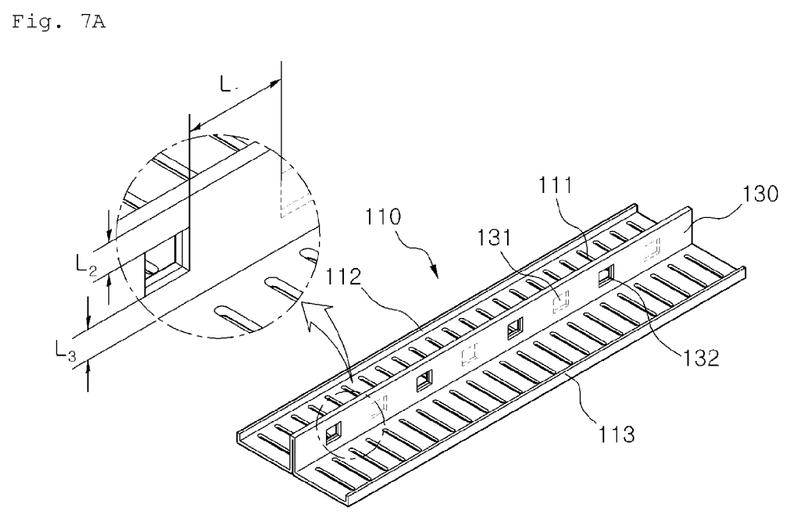
FIG. 7A is a perspective view illustrating an example of a header of the heat exchanger according to another embodiment of the present invention.
Figure 7B:
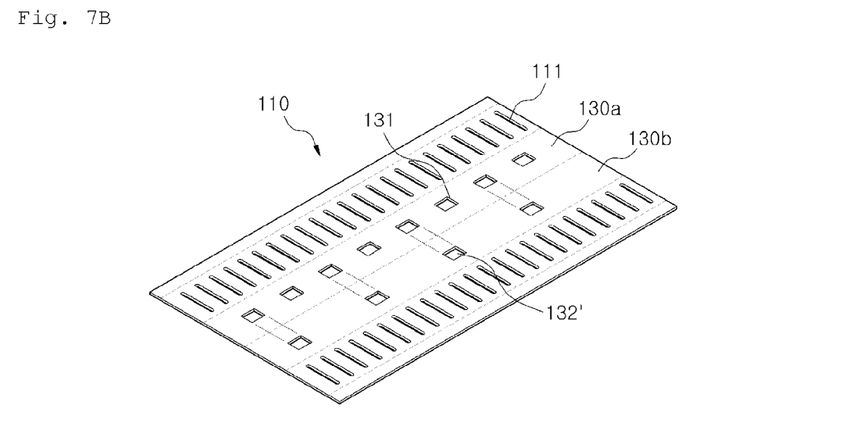
FIG. 7B is a development view illustrating a plate constituting the header shown in FIG. 7A.

FIG. 7A is a perspective view illustrating an example of a header 110 of the heat exchanger 1000 according to another embodiment of the present invention and FIG. 7B is a development view illustrating a plate constituting the header 110 shown in FIG. 7A. In the heat exchanger 1000 of the present invention, a hole 132' may be formed in the portion of the first wall 130a or the second wall 130b corresponding to the discharge part 131 formed in the other of the first wall 130a and the second wall 130b, so that a communication part 132 is formed to communicate the compartments partitioned by the partition wall 130.

In the heat exchanger 1000 shown in FIGS. 7A and 7B, a plurality of the discharge parts 131 is formed in the first wall 130a with a predetermined spacing and the hole 132' is formed in the portion of the second wall 130b corresponding to the discharge part 131 of the first wall 130a. Therefore, the hole 132' and the discharge part 131 are communicated with each other to form the communication part 132. In the present embodiment, the hole 132' and the discharge part 131 has the same size and shape.

In other words, the discharge part 131 may act to readily discharge the foreign substances as well as to form the communication part 132 together with the hole 132' and thus can be employed in various types of heat exchangers 1000.

Figure 8A:
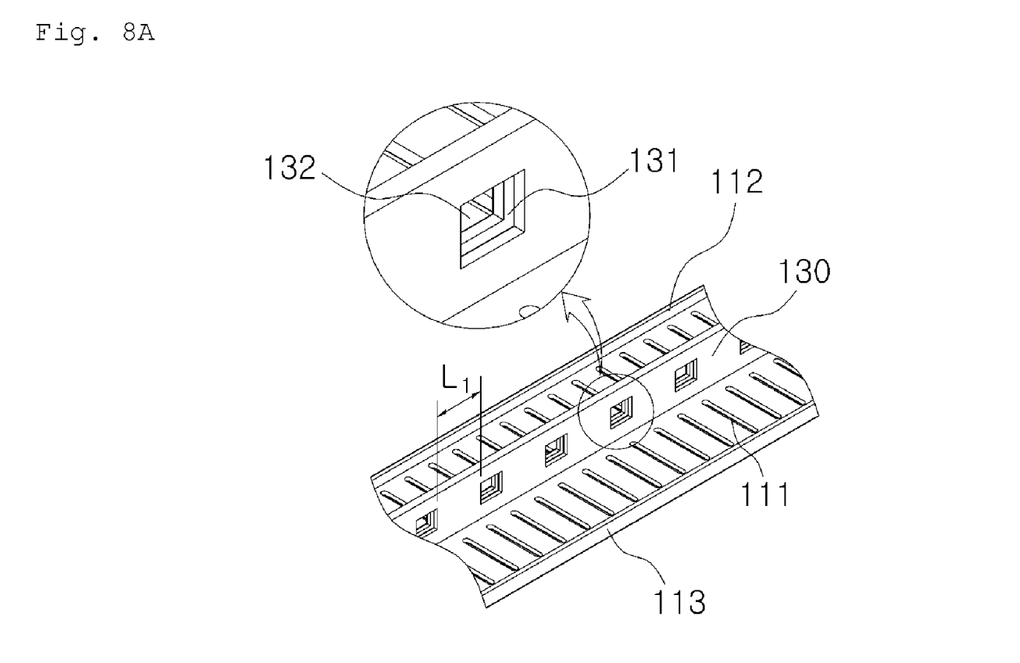
FIG. 8A is a perspective view illustrating another example of the header of the heat exchanger according to another embodiment of the present invention.
Figure 8B:
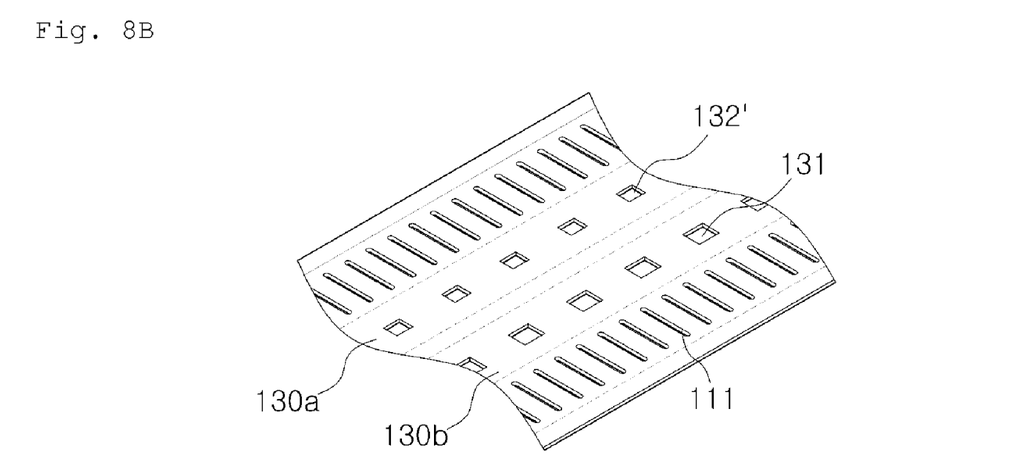
FIG. 8B is a development view illustrating a plate constituting the header shown in FIG. 8A.

FIG. 8A is a perspective view illustrating another example of the header 110 of the heat exchanger 1000 according to another embodiment of the present invention and FIG. 8B is a development view illustrating a plate constituting the header 110 shown in FIG. 8A. In the heat exchanger 1000 of the present invention, sizes of the discharge parts 131 or the hole 132' formed in the first wall 130a or the second wall 130b forming the partition wall 130 are different, so that the performance of discharging the foreign substances can be raised and the communication part 132 can be formed as well.

In the heat exchanger 1000 shown in FIGS. 8A and 8B, a square shaped discharge part 131 is formed in the second wall 130b and a hole 132' of a size as small as included in the discharge part 131 formed in the second wall 130b is formed in the first wall 130a. Therefore, the communication part 132 is formed by joining of the first wall 130a and the second wall 130b.

In other words, the internal portion formed by overlapping of the hole 132' with the discharge part 131 forms the communication part 132 and the region at the periphery of the communication part 132, in which the second wall 130b is cut out and the first wall 130a alone is present, performs the original role of the discharge part 131.

Therefore, in the heat exchanger 1000 of the present invention, it is easy to control the location and size of the communication part 132 by changing shapes, sizes and locations of the discharge part 131 and the hole 132' formed in the first wall 130a and the second wall 130b prior to folding of the first wall 130a and the second wall 130b. Therefore, design and modification of the heat exchanger 1000 is facilitated.

Figure 9:
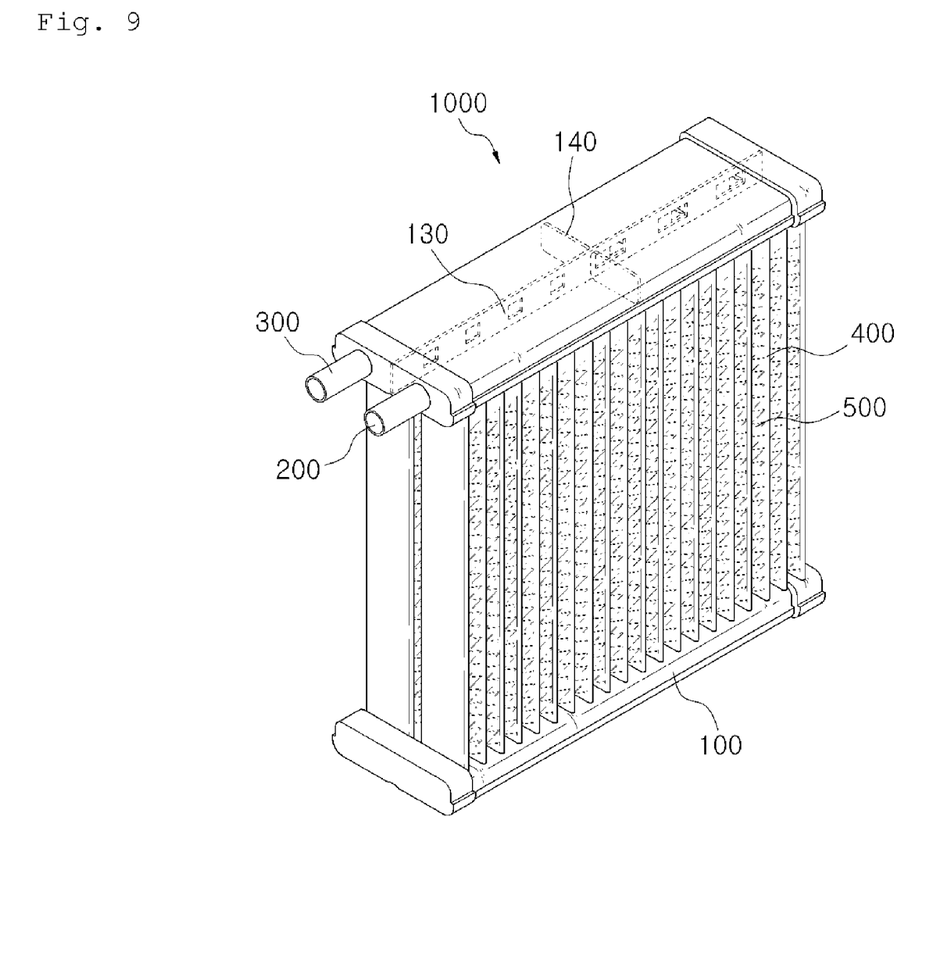
FIG. 9 is a perspective view illustrating a heat exchanger according to another embodiment of the present invention.

FIG. 9 is a perspective view illustrating a heat exchanger 1000 according to another embodiment of the present invention. The heat exchanger 1000 shown in FIG. 9 has the same structure as the heat exchanger 1000 shown in FIGS. 2 and 3 except that a baffle 140 is formed therein and a predetermined portion of the partition wall 130 is formed with the communication part 132.

Figure 10A:
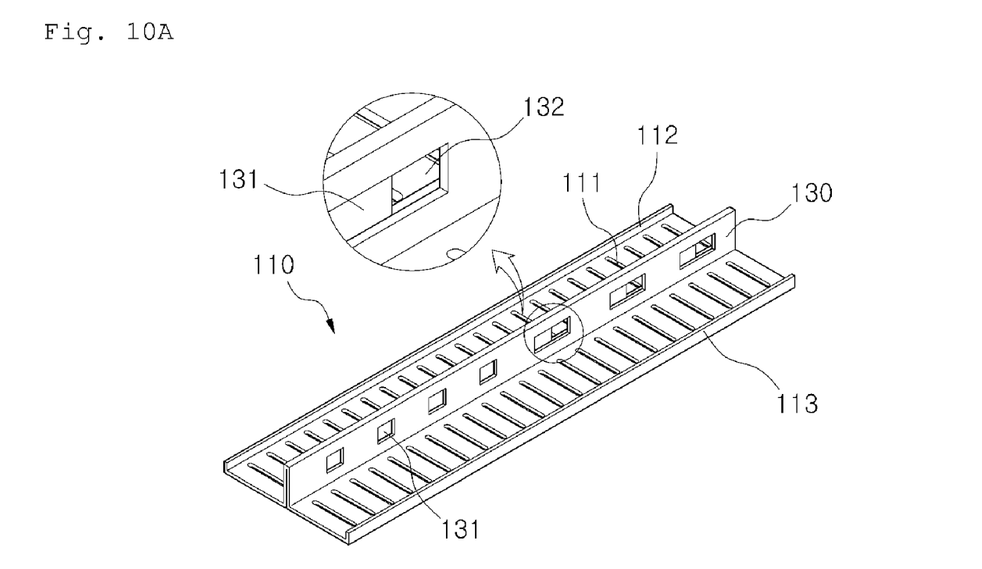
FIG. 10B is a development view illustrating a plate constituting the header shown in FIG. 10A.
Figure 10B:
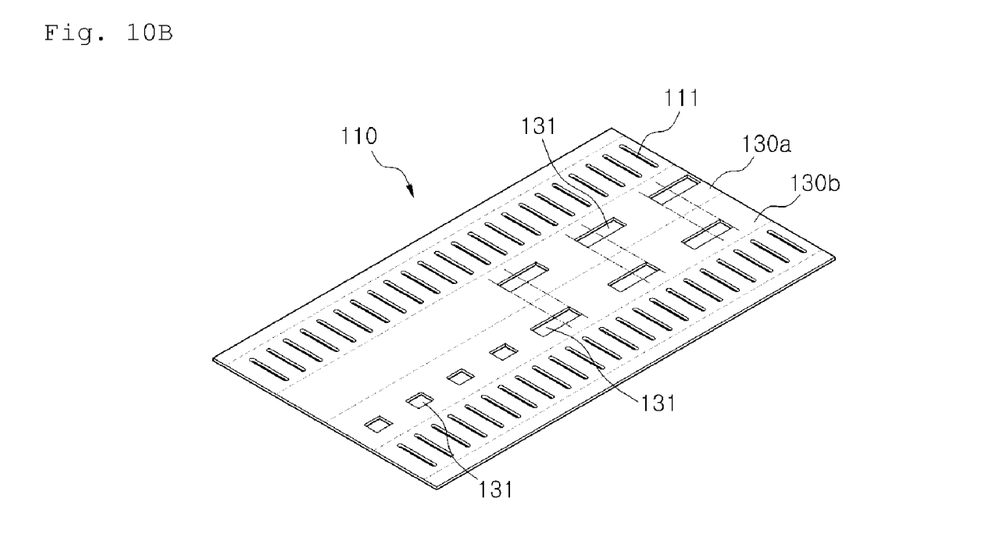

FIG. 10A is a perspective view illustrating a header 110 of the heat exchanger 1000 shown in FIG. 9 and FIG. 10B is a development view illustrating a plate constituting the header 110 shown in FIG. 10A. In the heat exchanger 1000 of the present invention, the communication part 132 may be formed by control the location and size of the discharge part 131.

In the heat exchanger 1000 of the present invention shown in FIGS. 10A and 10B, predetermined regions of the discharge parts 131 formed in the first wall 130a and the second wall 130b are overlapped with each other to form the communication part 132 for communicating the compartments partitioned by the partition wall 130.

In general, the heat exchanger 1000 is provided with the compartment formed by the partition wall 130 and having a predetermined space, a baffle formed in a width direction of the header tank 100 and partitioning the compartment, and the communication part 132 formed by cutting out a predetermined portion of the partition wall 130 and allowing the heat exchanging medium to flow between the compartments, so that the internal heat exchanger medium has various flows.

In other words, the communication part 132 is a region in which a predetermined portion of the partition wall 130 is cut out and the communication part 132 may be formed in such a manner that predetermined regions of the discharge parts 131 formed in the first wall 130a and the second wall 130b are overlapped with each other.

In the header 110 shown in FIGS. 10A and 10B, the predetermined regions of the discharge parts 131 formed in the first wall 130a and the second wall 130b are overlapped with each other. At this time, the overlapped middle portion is completely perforated to form the communication part 132 and the discharge parts 131 opened toward the compartment are formed at both sides of the communication part 132.

At this time, the distance $L_1$ between the discharge parts 131 means the distance $L_1$ between the discharge parts 131 in the region not formed with the communicating part 132 and does not mean the diameter of the communication part 132 formed by the predetermined regions of the discharge parts 131 formed in the first wall 130a and the second wall 130b.

FIG. 9 illustrates an example of the heat exchanger 1000 in which the header tank 100 is formed by coupling of a header 110 integrally formed with the partition wall 130 and a tank 120, the inlet pipe 200 and the outlet pipe 300 are formed in one side of the upper header tank 100, and the baffle 140 is formed in the inside of the header tank 100. In the heat exchanger 1000, the heat exchanging medium introduced through the inlet pipe 200 flows to the lower header tank 100 through the heat transfer tubes 400 while moving to the region formed with the baffle 140 and then flows again to the upper header tank 100 through the heat transfer tubes 400 while moving in the longitudinal direction of the lower header tank 100. The heat exchanging medium moved to the upper header tank 100 is moved to the opposite compartment through the communicating part 132 of the partition wall 130, then flows to the lower header tank 100 through the rear tubes 400, and then moved to the upper header tank 100 and is finally discharged through the outlet pipe 300.

In the heat exchanger 1000, since it can partition the compartments using the partition wall 130 and form various heat exchanging medium passages by controlling the location and size of the communication part 132 and the location of the baffle 140 as shown in FIG. 9, it is possible to enhance the brazing performance using the discharge part 131 and easily modify the communication part 132.

Figure 11A:
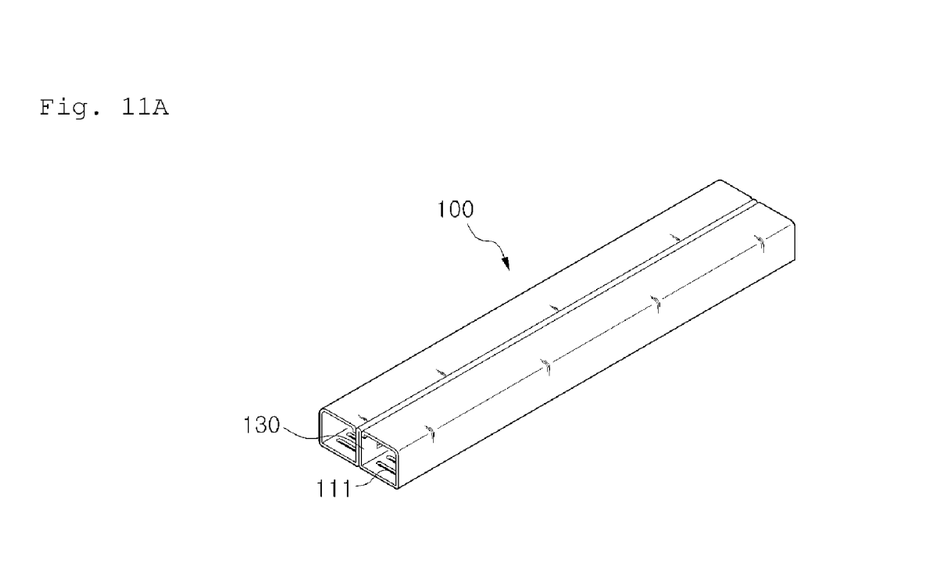
FIG. 11A is a perspective view illustrating a header of the heat exchanger shown in FIG. 9.
Figure 11B:
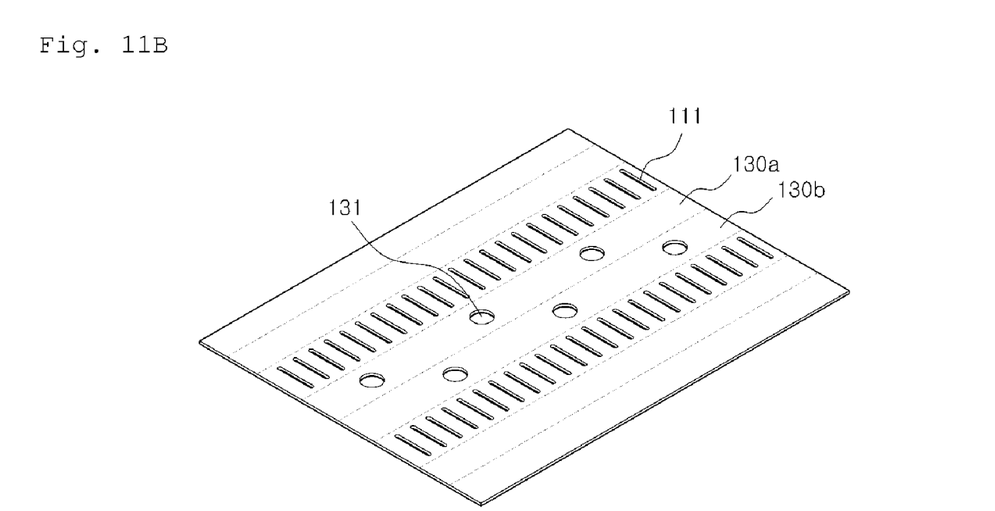
FIG. 11B is a development view illustrating a plate constituting the header shown in FIG. 11A.

While the heat exchanger 1000 shown in FIGS. 2 through 10B is an example in which the header tank 100 is formed by coupling of the header 110 and the tank 120 and the header 110 is integrally formed with the partition wall 130 by folding, it is possible to form the entire header tank 100 using a single plate and face and join the middle portions of the plate with each other to form the partition wall 130 as shown in FIGS. 11A and 11B.

FIG. 11B illustrates a modification in that the discharge part 131 is formed alternately in two walls 130a, 130b of the plate forming the partition walls 130 and has a circular shape.

Figure 12:
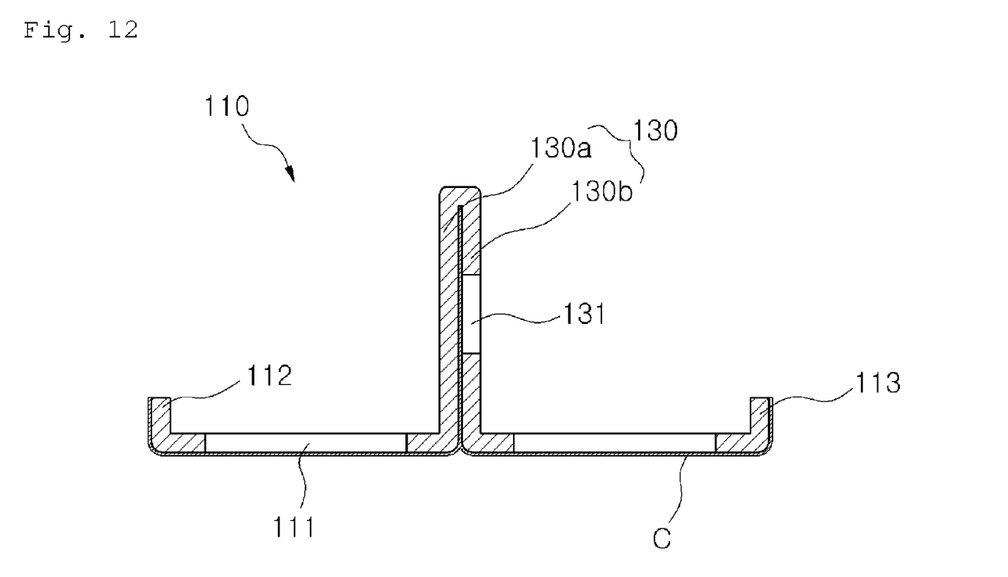
FIG. 12 is a cross sectional view illustrating a header of the heat exchanger according to the present invention.

FIG. 12 is a cross sectional view illustrating a header 110 of the heat exchanger 1000 according to the present invention. The heat exchanger 1000 of the present invention is characterized in that a clad material C is applied on only one face of the plate forming the header 110 in which the first wall 130a and the second wall 130b are joined with each other.

FIG. 12 is a view for explaining the face on which the clad material C is applied. In the heat exchanger 1000 of the present invention, the clad material C applied for forming the header 110 and joining the entire heat exchanger 1000 is applied on only one face of the plate forming the header 110 in which the first wall 130a and the second wall 130b are joined with each other.

The face in which the clad material C is not applied is a portion that forms a space for the flow of the heat exchanging medium together with the tank 120. In the case that the clad material C is also applied on the aforementioned region, there may occur a problem that an end of the tube 400 fixedly inserted into the tube inserting hole 111 is blocked by the clad material C and thus the heat exchanging medium cannot flow smoothly.

Therefore, in the heat exchanger 1000 of the present invention, the clad material C is applied on only one face of the plate forming the header 110 in which the first wall 130a and the second wall 130b are joined with each other and thus it is possible to prevent the blocking of the tube 400 previously.

Figure 13:
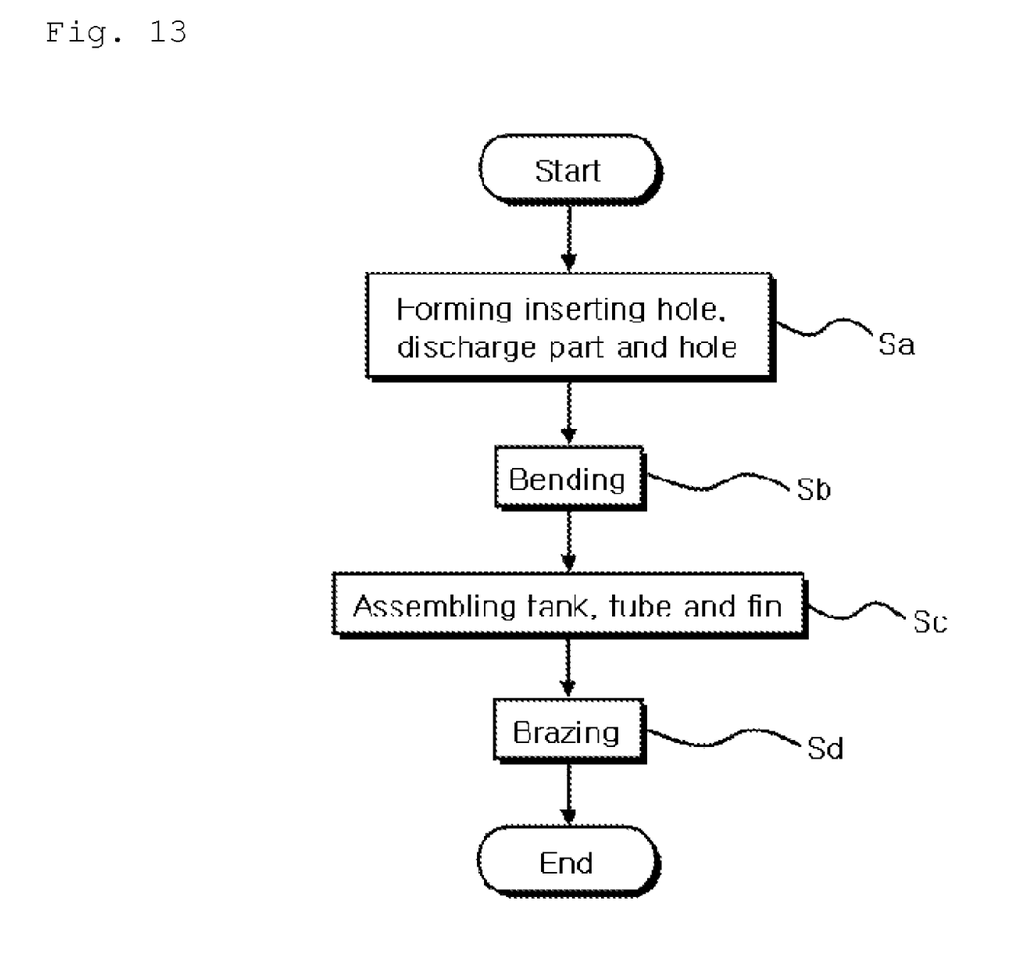
FIG. 13 is a flow chart illustrating a method for manufacturing a heat exchanger according to an embodiment of the present invention.

FIG. 13 is a flow chart illustrating a method for manufacturing a heat exchanger 1000 according to an embodiment of the present invention. A method for manufacturing a heat exchanger 1000 including a pair of header tanks 100 spaced apart from each other by a predetermined distance and disposed parallel to each other, each tank 120 having a partition wall 130 for partitioning an internal compartments which is formed by joining two facing plates; an inlet pipe 200 and an outlet pipe 300 formed in the header tank 100; a plurality of tubes 400, each tube being fixed by the pair of the header tanks 100 at both ends thereof to form a passage for heat exchanging medium; and a plurality of fins 500 interposed between the tubes 400, includes a) a step of forming the tube inserting hole 111, the discharge part 131 and the hole 132' (Sa); b) a bending step (Sb); c) a step of assembling the tank 120, the tubes 400 and the fins 500 (Sc); and a brazing step (Sd).

The step a) of forming the tube inserting hole 111, and the discharge part 131 (Sa) is the step of forming the tube inserting hole 111, and the discharge part 131 in a plate for forming the header 110. Preferably, the step a) is more comprised forming a hole 132' formed in a portion corresponding to the discharge part 131 to form a communication part in a plate. Since all of the tube inserting hole 111, the discharge part 131 and the hole 132' are hollowed, it is preferable to press the plate so that these are formed at once.

The step b) of bending (Sb) is the step of bending the plate formed with the tube inserting hole 111, the discharge part 131 and the hole 132' and forming the header 110. The header 110, as described above, is provided with the partition wall 130 integrally formed therewith and the first protrusion part 112 and the second protrusion part 113 formed long in the longitudinal direction of the plate at both sides of the plate and protruded in the same direction as the direction in which the partition wall 130 is formed, so as to provide a coupling face with the tank 120, and thus has a "W" shaped cross-section.

In the step a) of forming the tube inserting hole 111, the discharge part 131 and the hole 132' (Sa) or the step b) of bending (Sb), oil is used to raise the process efficiency. In general, a quick drying oil is used so that the oil can be removed through simple dry. However, it is difficult to completely remove the oil due to the closed structure of the partition wall 130 in which they are faced and joined with each other and thus the remained oil acts as an impurity in the subsequent processes.

In other words, in the heat exchanger 1000 and the method for manufacturing the same according to the present invention for solving the aforementioned problem, the discharge part 131 is formed in the partition wall 130 and thus the oil as well as the foreign substances such as the air which may be included in the inside of the partition wall 130 can be readily discharged through the discharge part 131.

The step c) of assembling the tank 120, the tubes 400 and the fins 500 (Sc) is the step of preliminary assembling the basic components of the heat exchanger 1000 by assembling the tank 120, the tubes 400 and the fins 500 to the header 110. Prior to this assembling step, a step of applying a flux may be included.

The step d) of brazing (Sd) is the step in which the components of the heat exchanger 1000 are joined by melting of the clad material C. The preliminarily assembled heat exchanger 1000 is finally completed through the brazing step (Sd).

As described above, according to the heat exchanger 1000 of the present invention, productivity can be increased since the tube inserting hole 111, the discharge part 131 ad the hole 132' can be formed by a one-time process, and the oil, air and foreign substances can be readily discharged through the discharge part 131 upon the final step of brazing and the joining performance can be increased.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A heat exchanger, comprising:
   a pair of header tanks spaced apart from each other by a predetermined distance and disposed parallel to each other, each header tank having a partition wall for partitioning an internal compartment;
   an inlet pipe and an outlet pipe formed in the header tank;
   a plurality of tubes, each tube being fixed by the pair of the header tanks at both ends thereof to form a passage for a heat exchanging medium, thereby permitting the heat exchanging medium in an inside of the compartment partitioned by the partition wall to flow; and
   a plurality of fins interposed between the tubes,
   wherein
   each of the pair of header tanks is formed by coupling of a tank, which is formed by bending a first plate, and a header formed by bending a second plate,
   the header is formed in a "W" shape cross-section in such a manner that in the partition wall for partitioning the internal compartment, entire surfaces of a first wall and a second wall are faced and joined to each other and a first protrusion part and a second protrusion part, protruding in the same direction as the direction in which the partition wall is formed, are formed at opposite sides of the second plate in a longitudinal direction of the plate so as to provide a coupling face with the tank, the tank includes a plurality of chambers inside and defined by the partition wall corresponding to the first and second walls, and the first and second protrusion parts, a portion of one of the first wall and the second wall forming the partition wall being cut completely therethrough to form a discharge part, the discharge part being completely overlapped by the other of the first and the second wall, thereby exposing the other of the first and the second wall to the chamber adjacent the discharge part;

at least one communication part comprising a hole extending completely through the partition wall, wherein no portion of the discharge part and the communication part overlap;

wherein a plurality of discharge parts are formed alternately in the first wall and the second wall in a longitudinal direction of the header tank.

2. The heat exchanger as set forth in claim 1, wherein the discharge part is formed in plural along a longitudinal direction of the partition wall.

3. The heat exchanger as set forth in claim 1, wherein a clad material is applied to only one face of the plate for forming the header, in which the first wall and the second wall are joined with each other.

4. The heat exchanger as set forth in claim 1, wherein a distance between the discharge parts is 1 to 5 mm.

5. The heat exchanger as set forth in claim 4, wherein a distance between the discharge part and an end of the partition wall in a height direction of the partition wall is 1 to 5 mm.

6. The heat exchanger as set forth in claim 1, wherein the heat exchanger is further formed with a guide slot on a face in which the first wall and the second wall are joined with each other so that the foreign substances can be smoothly discharged through the discharge part.

* * * * *